Fig. 1

INVENTOR.
PEYTON W. DOUGLAS fig. 2

INVENTOR
PEYTON W. DOUGLAS
BY Richmond A. Hayes
ATTORNEY fig. 3

INVENTOR
PEYTON W. DOUGLAS
BY Richmond S. Hayes
ATTORNEY

Dec. 4, 1962 P. W. DOUGLAS 3,066,422
CLOTHES DRIERS
Filed Jan. 7, 1959 7 Sheets-Sheet 5 fig. 5 fig. 6

INVENTOR
PEYTON W DOUGLAS

BY

ATTORNEY fig. 12

United States Patent Office 3,066,422
Patented Dec. 4, 1962

3,066,422
CLOTHES DRIERS
Peyton W. Douglas, Syracuse, N.Y., assignor to Blackstone Corporation, Jamestown, N.Y., a corporation of New York
Filed Jan. 7, 1959, Ser. No. 785,372
5 Claims. (Cl. 34—82)

This invention relates to improvements in a domestic clothes drier of the type in which drying is accomplished by tumbling clothes in a horizontally rotating drum in the presence of controlled flow of heated air. More particularly, the invention is directed to a drier having a drum, the cylindrical wall of which is perforated adjacent the forward end of the drum. The drum ends are supported by large diameter bearings having large central openings, one opening giving access to the drum interior for inspection and removal of clothes and the other to a heating unit.

In a drier of this general type, efficient and quick drying requires that particular attention be given to the manner in which the heated air enters the drum, passes through the clothes, and exhausts through a lint trap. The present drier accomplishes proper control and flow of heated air in a simple structure that lends itself to economical manufacture.

The invention is, therefore, directed to and has for a primary object a clothes drier having an open ended rotatable drum, together with an arrangement for the flow of heated air that assures the extremely thorough drying of clothes in a minimum of time and without incurring wear or damage.

Another important object of the invention is found in the particular structure employed to control and direct movement of heated air into and out of the rotating drum in a manner to effect a complete drying operation.

Another object of the invention resides in the use of structure which enables the selective mounting of a heating unit that operates either by electricity or gas.

Other objects and advantages of the invention are to be found in the structural details of a drier which enable quick and easy assembly and, by the same token, greatly facilitate access to all operative parts for purposes of adjustment or replacement.

Specific structural and operative advantages of the invention will be more fully understood from a consideration of the following specification, taken in conjunction with the accompanying drawings; in which.

Figure 1:
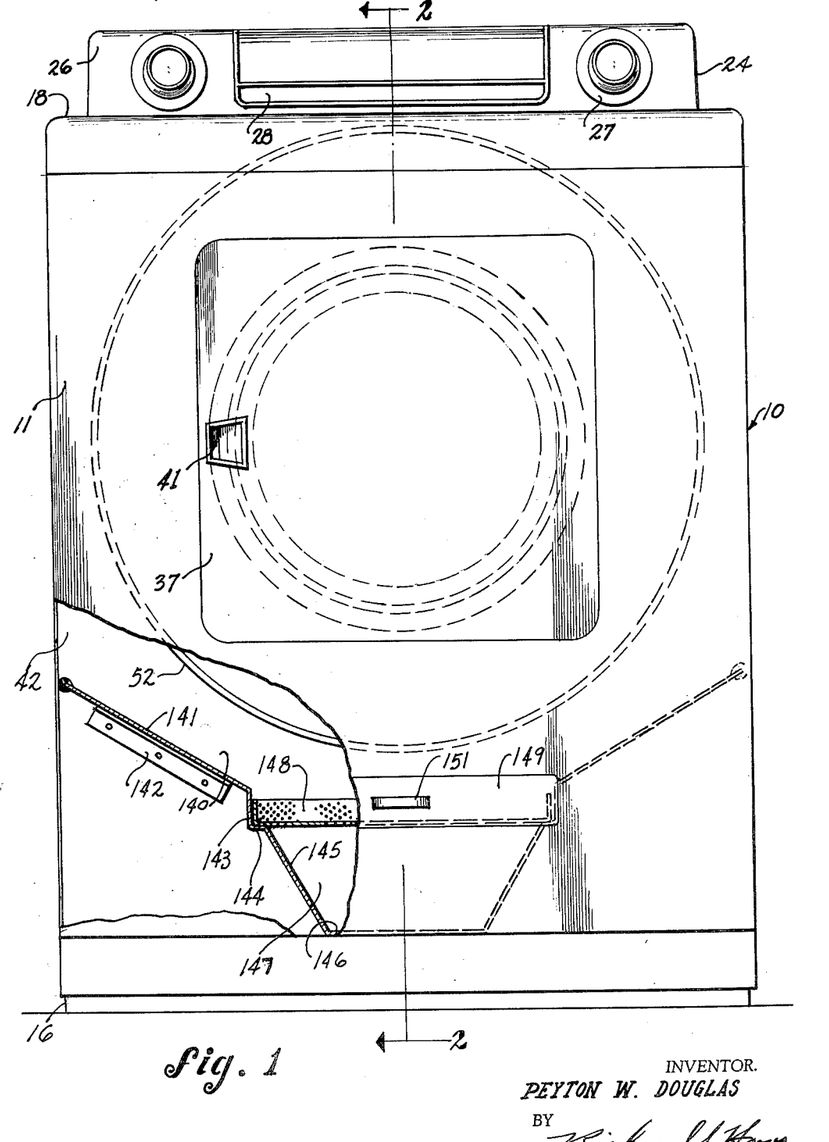
FIG. 1 is a front elevational view of a clothes drier embodying one form of the invention, the front cabinet wall being partially broken away to disclose a portion of the lint trap.

Referring more particularly to the drawings, the reference numeral 10 is employed to generally designate a cabinet embodying the invention. This cabinet is of sheet metal construction and comprises a front wall 11, side walls 12 and 13 and rear wall 14. A suitable base 16 supports the cabinet and, in conjunction with the front and side walls, provides a set-back to give the usual toe space 17. A top wall or plate 18 closes the upper end of the cabinet and, in the present instance, is shown to include a depending marginal flange or rim 19. This entire rim terminates in an inwardly extending flange 21 which seats on a gasket interposed between this flange and a corresponding, inwardly turned, horizontal flange 22 provided on all of the cabinet walls. The rear wall 14 may include an offset, upstanding flange 23 which serves as a locater for the top when it is mounted on the cabinet. The wall 14, near its lower end, is provided with several horizontal louvres 15 which give air access to the lower rear portion of the interior of the cabinet. The top 18 also includes a control enclosure, which, as suggested in FIGS. 1 and 2, takes the form of an elongated unit 24 extending substantially the full width of the cabinet and being located toward the rear of the top. This enclosure has an inclined front wall 26 on which suitable control knobs 27 are conveniently located, one adjacent each end of the wall 26. Between the knobs, any suitable ornamentation, such as indicated at 28, may be provided, this area being particularly suitable for the permanent application of instructions for operation of the drier.

The front wall 11 has an opening giving access to the front interior of the cabinet, and in the present disclosure, this opening is framed by a rectangular, stepped, recessed area 29 which is formed by inwardly directed flanges 31 that continue in short vertical flanges 32. Integral with the flanges 32 are further inwardly directed flanges 33 and vertical flanges 34. These last two flanges define a circular opening 36 which is the opening above mentioned as giving access to the cabinet interior. A rectangular door 37 is carried by suitable hinges 38 and consists of a vertical panel defined by marginally inturned flanges 39. At its free edge, the door is provided with a handle or grip element 41. The flanges 39 of the door project into the rectangular recessed area 29 of the front wall, when the door is closed, being in close proximity with the flanges 31 of the front wall 11.

The space within the cabinet is divided into two compartments; namely, a large drum receiving forward compartment 42 and a rear compartment 43 which is of considerably lesser proportions. These compartments are divided in part by a vertically disposed bulkhead 44. This bulkhead extends from the base 16 the full height of the cabinet walls and terminates in a horizontal flange 46 which, being of the nature of the wall flanges 22, seats the lower flanged edge of a divider 47 secured to the under face of the top 18. Of course, a further gasket is interposed between flanges 46 and divider 47. When the top 18 is in place (FIGS. 2 and 4), the divider 47 forms a continuation of the bulkhead 44, thus completing the front and rear compartments 42 and 43 up to the top of the cabinet. Midway of its side edges, the bulkhead 44 has a circular opening 48 which is centered with the access opening 36 in the front wall 11. The opening 48 is defined by a rearwardly directed flange 49. Beneath the opening 48, and in vertical alignment with the center thereof, the bulkhead is provided with an upwardly opening clip 51 which, in the present instance, is struck from the bulkhead and is designed to provide a horizontal seat for locating and supporting a heating unit hereinafter described.

The large front compartment 42 of the cabinet encloses a cylindrical tumbling drum, generally designated at 52. This drum includes a peripheral wall 53 and front and rear walls 54 and 56, respectively. Mounted in the drum is a set of tumbling vanes 57 which extend the full width of the drum; that is, from wall 54 to wall 56. The wall 53 has perforations 58 which are located forwardly thereof and are of such number as to occupy approximately an area equivalent to the forward one-fifth of the drum depth. The peripheries of the end walls 54 and 56 are laterally ribbed, as at 61, and terminate in inturned flanges 62, thus forming lateral pockets 63 which receive the edges of the wall 53. Any suitable means may be employed to permanently secure flanges 62 to the wall 53.

In the present disclosure, the drum is provided with three uniformly spaced vanes 57 consisting of plates having lugs 64 which project into slots 66 in the end walls 54 and 56. Each vane is mounted with the outer edge in abutment with the wall 53 and extends radially inwardly of the drum. The inner edge is rolled to form a tube 67. The front and rear walls 54 and 56 are provided with indentations 68 which correspond in number and location to the vanes 57. When the drum is assembled, the ends of the tubes 67 telescopically engage the indentations 68. Bolt 69 projects through the indentations and the tubes 67, at one end the bolt head seating in the indentation of one wall and the nut joined to the other end of the bolt seating in the indentation of the other wall. In this manner, the vanes 57 are not only securely joined to the front and rear walls of the drum, but the bolts by which they are so secured, in conjunction with the tube 67, serve to rigidify the drum in at least three different places. To further rigidify and strengthen the front and rear drum walls, these walls include a number of uniformly spaced, radial ribs 71.

The end walls 54 and 56 are provided with central openings 72 and 73, respectively. Adjacent these openings, the walls are laterally, outwardly offset to an extent suggested by the flanges 74, and from these flanges, extend radially inwardly, as at 75, terminating in axially directed flanges 76 and 77. The portion 75 of the rear wall 56 provides an annular recessed seat for a flat ring 78 which secures a screen 79 across the opening 73 and prevents clothes, during rotation of the drum, from entering this opening. As will subsequently be more fully brought out, the axially, outwardly extending, annular flanges 76 and 77 of the front and rear walls serve as bearing supports for the drum.

Figures 4, 11:
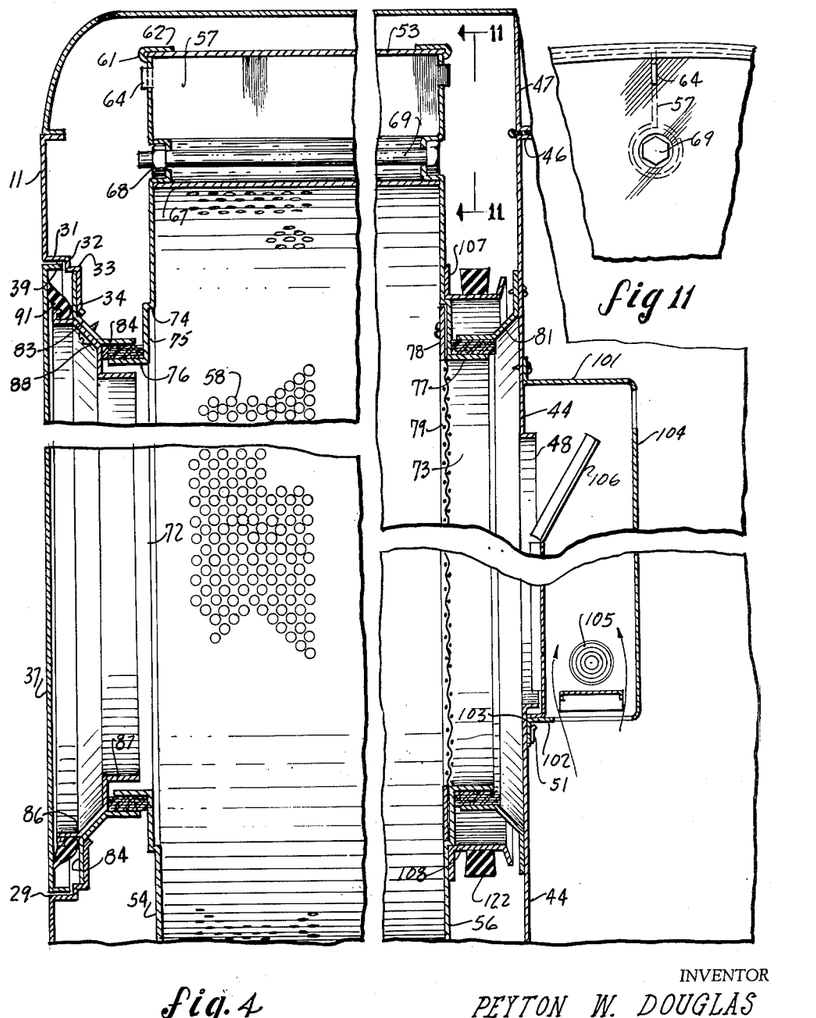
FIG. 4 is a greatly enlarged fragmentary vertical sectional view of a substantial portion of the drum and its mounting, the cabinet bulkhead mounting a gas heater in place of the electrical heater shown in FIGS. 2 and 3.
FIG. 11 is a fragmentary end view of a portion of the drum, being taken substantially as suggested by the line 11—11 of FIG. 4.
Figure 5:
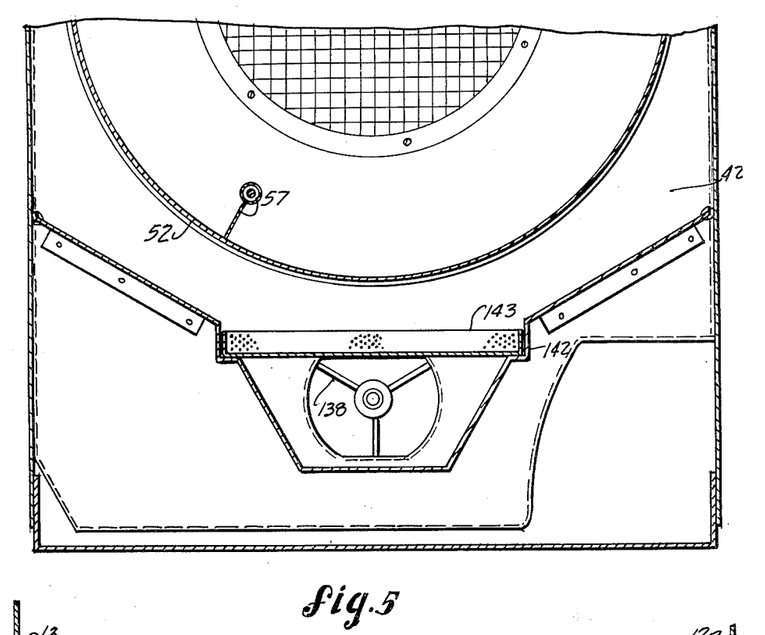
FIG. 5 is a fragmentary transverse sectional view taken substantially on the line 5—5 of FIG. 2.

Attached to the bulkhead 44 and extending into the compartment 42 is a ring 81, having a sleeve 82 that interfits the annular flange 77 of the drum. With suitable anti-friction material between the sleeve and flange, a proper rear bearing is provided for the drum. Similarly, the front of the cabinet is provided with a ring 83, having a sleeve portion 84 that projects inwardly through the access opening 36 and interfits the annular flange 76. These parts, with suitable anti-friction material therebetween, serve as a front bearing for the drum. A combined clothes guard and door sealer 86 is provided which, as seen in FIG. 4, includes an annular flange 87 that projects into the opening 72 and defines the access opening of the drum. A radially, outwardly inclined portion 88 is secured, in any suitable manner, to one or more of the flanges that frame the circular cabinet opening 36. A resilient gasket 91, carried by the member 86 is engageable by the door 37 to completely close or seal off the front of the cabinet.

Figure 3:
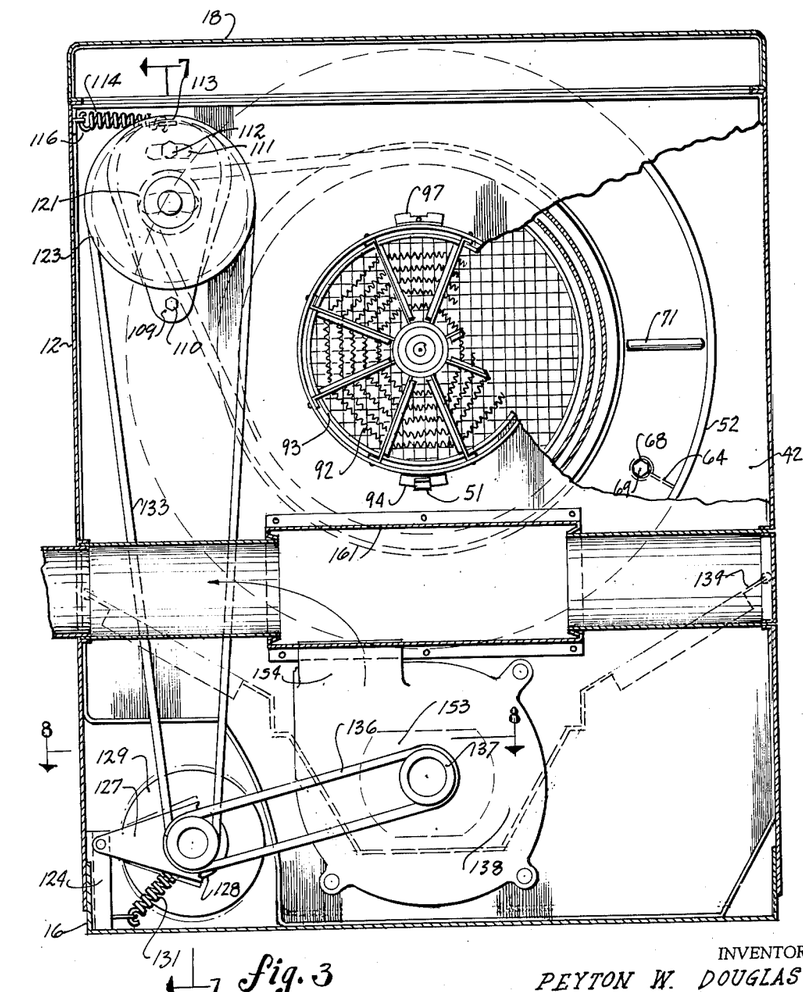
FIG. 3 is a vertical transverse sectional view, taken substantially on the line 3—3 of FIG. 2, part of the bulkhead in the cabinet being broken away to disclose a portion of the rotatable drum, together with details of the exhaust duct.

The fact that the front of the cabinet, when the door 37 is closed, is sealed against movement of air therethrough, determines that air may only enter the forward compartment 42 through the screened opening 48 in the bulkhead 44 and by way of the drum. The rear compartment 43 is not only intended to enclose a substantial portion of the necessary driving mechanism for the device, but also a unit for heating air that is drawn into the drum and serves to dry clothes while the drum is rotating. Referring to FIG. 3, an electrically operated heater 92 is provided and is contained within a cylindrical enclosure 93. An angle plate 94 is attached to the inner edge of the enclosure 93 and includes a depending flange 96 that projects into and is engaged by the clip 51 of the bulkhead. Diametrically opposite the angle plate 94 is a further angle plate 97, the upstanding flange 98 of which carries a screw 99. To mount the heater, it is merely necessary to engage flange 96 with clip 51, bring flange 98 into abutment with the bulkhead, and tighten screw 99. Since the cylinder enclosing the heater abuts the bulkhead, all air passing through it will first enter the drum and then flow through perforations 58 into compartment 42. Suitable electrical connections, together with switches, timers, or the like (not shown), render the control knobs 27 operable when connection is had with the usual source of current supply. It will be understood that a clothes drier embodying the features so far described could be equipped with another available air heating unit than the one shown and such other heater, in the form of a gas unit, is shown in FIG. 4, being generally designated by the numeral 101. This heater includes an enclosure, the base portion 102 of which is flanged, as at 103, to engage the clip 51. Air enters the unit through an opening in the base and the upper rear wall 104. A single port burner 105 projects into the unit from one side thereof and suitable baffles 106 serve to mix the hot gases with cooler air prior to entering the drum through the bulkhead opening 48. Due to the ample space of compartment 43, no difficulty is encountered substituting a gas burner and controls for the electrical appurtenances required with the electric heater 92. As several views in the drawings indicate, substantially all operative parts, with the exception of the drum, are accessible when the rear panel 14 of the cabinet is removed. Thus, convenient interchange of heaters is made possible as well as proper care and maintenance.

Reference is now particularly had to the mechanism employed to rotate the drum 52 and operate a device for circulating air therethrough during such rotation. The rear wall 56 of the drum mounts an annular flange 107 which is the supporting portion of a ring-like pulley 108. On the rear face of the bulkhead 44 is a plate 109 that is supported at its lower end for swinging movement by means of a pivot pin 110 which is secured to the bulkhead. Adjacent the upper end of this plate is a curved slot 111, the center of this curve being that of the pin 110. A bolt 112, carried by the bulkhead, projects into the slot 111 and, thus, the length of the slot determines the extent of pivotal movement of the plate about its pin. The upper end of the plate has a laterally extending flange 113 which is connected with one end of a spring 114, the other end of this spring being attached to a bracket 116 on the cabinet side wall 12. Below the slot 111, the plate 109 is formed with a sleeve 117 which houses a bearing 118. This bearing carries a short shaft 119, one end of which projects through the bulkhead 44. A belt 122 connects the drum pulley 108 with pulley 121. Because the plate 109, which carries the pulley shaft 119, is urged in one direction by the spring 114, the belt 122 is always under driving tension. However, by either disconnecting or extending the spring, the pulley 121 may be readily moved in a direction to enable removal or replacement of the belt 122.

The other end of the shaft 119 mounts a pulley 123 and, of course, this pulley is located to the rear of the bulkhead 44 in the compartment 43. In the base of the cabinet, a support 124 serves to mount a rod 126 to which are secured common ends of a motor supporting bracket 127. The free ends of motor bracket 127 are of the nature of yokes 128 which are engaged with the end housings of a motor 129. A spring 131 is secured at one end to the cabinet base and, at the other end is engaged with one of the yokes 128. One end of the motor shaft mounts a pulley 132 and a belt 133 connects this pulley with the pulley 123 carried by shaft 119. The above structure, clearly detailed in FIGS. 3, 7, and 8, not only discloses the reduction drive as between motor 129 and drum 52, but also the means for maintaining the drum belt 122 and drive belt 133 under operative tension. It will be observed in FIG. 3 that the tensioning means for the drum belt 122 in nowise affects tensioning the motor belt 133 and, similarly, the tensioning means and support for the motor 129 have no effect on the drum belt 122. A further pulley 134, on the motor shaft, mounts a belt 136 which is engaged with a pulley 137 extending rearwardly from an air circulating fan 138 mounted in a housing 139 that is attached to the rear of the bulkhead 44.

Figure 2:
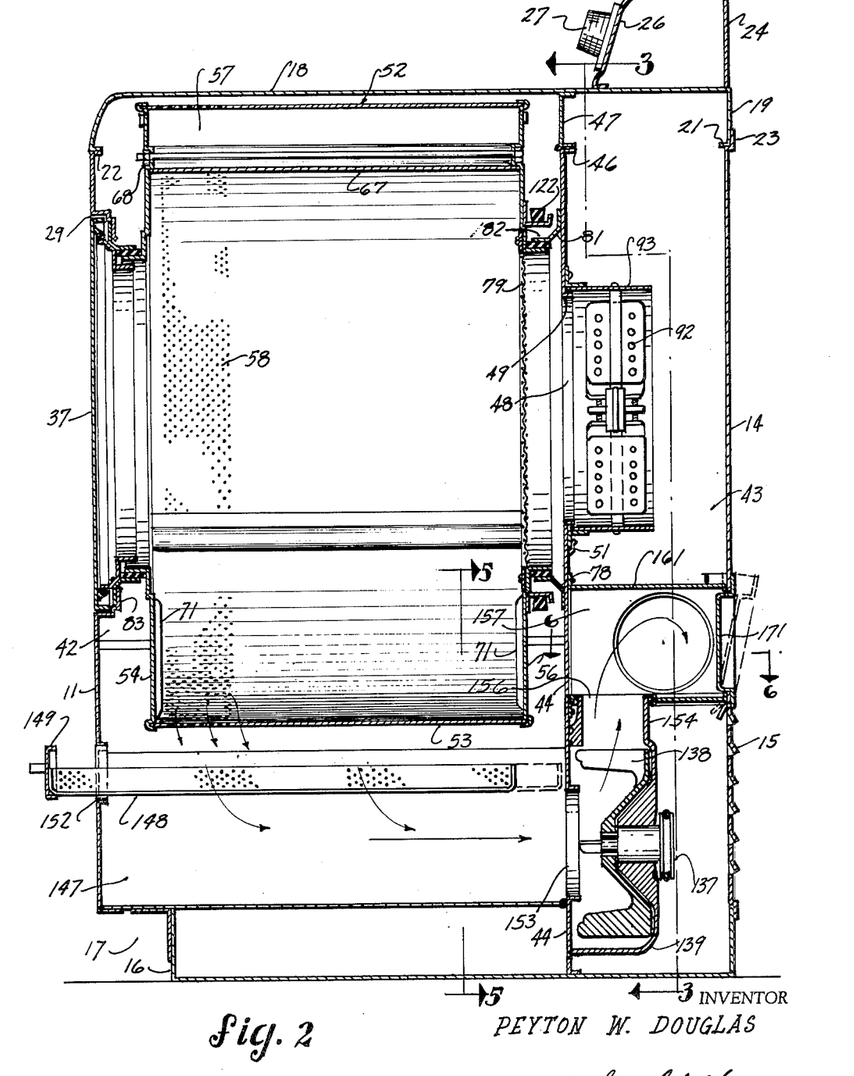
FIG. 2 is a vertical sectional view, taken substantially on the line 2—2 of FIG. 1 and, in addition to orienting many of the structural parts, shows the lint tray partially withdrawn from the cabinet.
Figure 6:
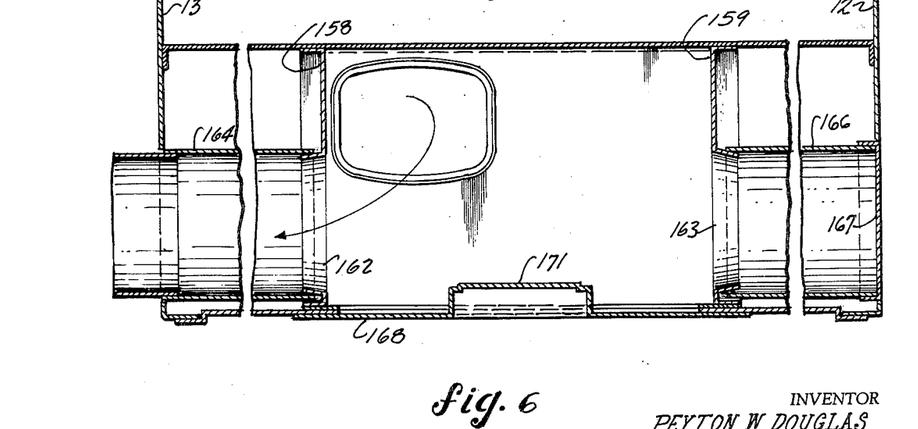
FIG. 6 is a horizontal sectional view, taken substantially on the line 6—6 of FIG. 2 and shows a selective directional arrangement for exhausting air.
Figures 7, 8, 9, 10:
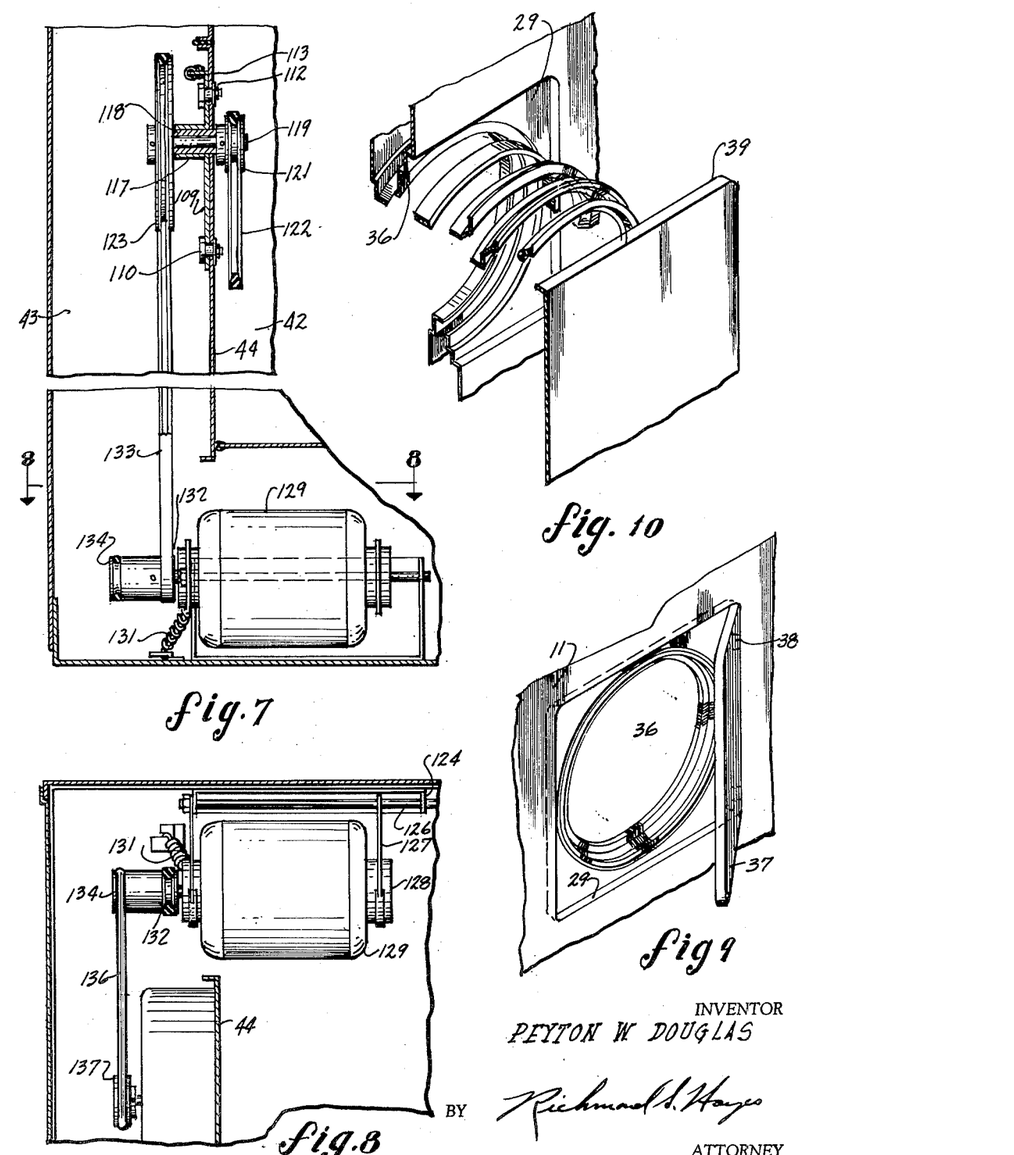
FIG. 7 is a fragmentary vertical view, partly in section, being taken substantially on the line 7—7 of FIG. 3 and shows the motor location and certain details of the driving mechanism for the drum.
FIG. 8 is a fragmentary top plan view, partly in section, being taken substantially on the line 8—8 of FIG. 7 and shows further details of the motor and drive.
FIG. 9 is a fragmentary perspective view of the cabinet access opening and door.
FIG. 10 is an exploded fragmentary perspective view of the front bearing mount for the drum.
Figure 12:
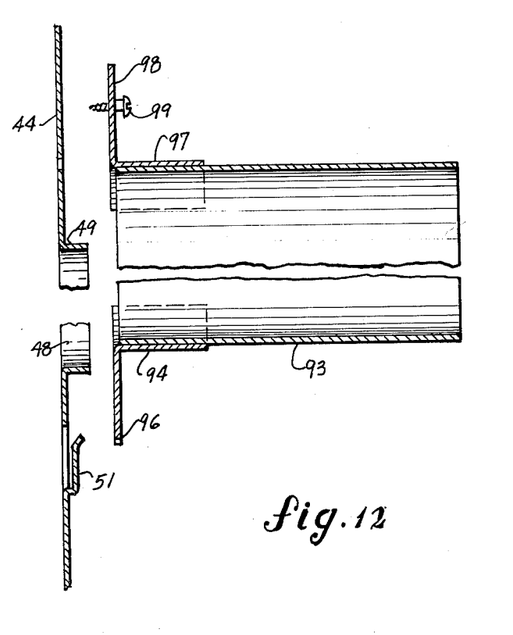
FIG. 12 is a vertical fragmentary exploded view showing the means for mounting either of the heaters shown.

Since the particular means and method employed to heat and dry clothes as they are being tumbled in the drum constitute an important part of the present disclosure, attention is now more particularly directed to FIGS. 1, 2, 5, and 6. In FIG. 2 the rear compartment 43 is shown to be the full height of the cabinet, whereas the bottom of the front compartment 42 takes the general form of a trough 140. This trough in part consists of inclined walls 141 which are secured to the forward face of the bulkhead 44 and the inner face of the front wall 11 of the cabinet by flanges 142. The walls 141, somewhat inwardly of the sides of the cabinet, are bent directly downwardly, as at 143. From the shoulder 144 the walls assume a slightly steeper incline, as suggested at 145, and are integral with a base wall 146. The inclined portions 145 and the base 146 combine to complete the lower portion 147 of the trough. As shown in FIGS. 3 and 7, motor 129 is mounted below trough 140 in a space formed by an offset portion of bulkhead 44, thereby permitting free access of cool air from the room to the motor.

Directly above portion 147 of the trough, shoulders 144 provide support for a lint tray or trap 148. This tray has a solid front wall 149 to which is affixed a handle 151. A suitable opening 152 in the front wall 11 of the cabinet enables moving the tray into and out of the cabinet, the shoulders 144 and flanges 143 cooperating to provide suitable guides for such movement. The side and bottom walls of the tray 148 are finely perforated and thus air may move from the compartment 43 through the perforations of the tray into the lower portion 147 of the trough. Examination of FIG. 2 indicates that the trough extends from the front cabinet wall 11 to the bulkhead 44, and an opening 153 gives access, through the bulkhead 44, to the interior of the fan housing 139. A neck portion 154 of the housing 139 connects through opening 156 into the base of an air exhaust compartment 157. This compartment is less than the full width of the cabinet and is bounded by the base above referred to, bulkhead 44, end walls 158, 159, and top wall 161. In other words, compartment 157 is a completely closed off compartment within the rear compartment 43 of the cabinet. The end walls 158 and 159 are apertured, as at 162 and 163, and horizontally extending tubes 164 and 166 connect these apertures with openings in the cabinet side walls 12 and 13. As shown in FIG. 6, tube 166 is fitted with a plug 167. Also, the rear of the compartment is closed by a plate 168 which has a central opening 169 that is fitted with a door 171. Although the compartment 157 lies wholly within the rear compartment 43, it in nowise restricts the influx of air through the louvered openings 15 into either of the heaters 92 or 101. By reason of the compartment 157, it is possible to selectively exhaust the moisture laden air from the rear or either side of the cabinet.

Although operation is undoubtedly clear from the above description, it may be pointed out, however, that clothes to be dried are inserted into the drum through the cabinet opening 36. When the door 37 is closed against gasket 91, the front compartment 42 of the cabinet is sealed against intake of air except through the bulkhead opening 48. Air passing through the bulkhead is heated by either of the heaters 92 or 101. When the motor 129 is in operation, the drum 52 rotates and the fan 138 draws air through the louvered openings 15 into the rear compartment 43. Air drawn into the drum passes through the heater and becomes heated to an extent determined by a suitable control. As has been indicated, this heated air passes through the clothes while they are more or less in mid-air; that is, dropping from the top portion of the drum toward the bottom. The moisture laden air, upon leaving the drum through openings 58, passes into the front compartment 42 and is drawn downwardly into the lower portion 147 of the trough through the lint trap 148. Thence the air moves through the fan 138 into the exhaust compartment 157 and then out of the cabinet through any one of the openings in said compartment.

It will be understood and appreciated that although applicant has shown and described his invention in connection with one particular type of clothes drier, variations in the general drier structure may be made and are contemplated as being within the spirit and scope of the invention insofar as such variations are encompassed by the annexed claims.

Having thus set forth my invention, what I claim as new and for which I desire protection by Letters Patent is:

1. In a clothes drier having a cabinet, a bulkhead dividing the interior of said cabinet into a larger front compartment and a lesser rear compartment, a drum in said front compartment mounted for rotation about a horizontal axis and having co-axial openings in the ends thereof, the front portion only of the circumferential wall of said drum being perforated, a door in one wall of said cabinet closing the front opening in said drum, an air heater in said rear compartment mounted on said bulkhead and embracing an opening therein co-axial with the rear opening in said drum, a tray-like lint trap dividing said front compartment into upper and lower portions, a housing enclosed exhaust fan in said rear compartment, said housing and said bulkhead having openings connecting the lower portion of said front compartment with an exhaust duct.

2. In a clothes drier having a cabinet and a door, in the front wall thereof providing access to the cabinet interior, a bulkhead in said cabinet dividing the interior thereof into front and rear compartments, a clothes receiving drum in the front compartment rotatable about a horizontal axis and having co-axial openings in the front and rear walls thereof, the front portion only of the circumferential wall of said drum being perforated, said cabinet door when open giving accress to the opening in the front wall of said drum, an air heater in the rear compartment mounted on said bulkhead and embracing an opening therein co-axial with the rear opening in said drum, said cabinet door, when closed, requiring air entering said drum through said heater to pass through the perforations in said drum into said front compartment, walls defining a bottom trough in said front compartment, a housing enclosed fan in the rear compartment, openings in said housing and said bulkhead connecting said trough with an exhaust duct, and a lint trap separating the front compartment from said trough.

3. In a clothes drier having a cabinet, a bulkhead vertically dividing the interior of said cabinet into a larger front compartment and a lesser rear compartment, an open ended drum in said front compartment rotatable on suitable bearings about a horizontal axis, the front portion only of the peripheral wall of said drum having a series of perforations, a door in one wall of said cabinet closing the front opening in said drum, an air heater in said rear compartment mounted on said bulkhead and embracing an opening therein co-axial with the rear opening in said drum, said perforations giving air access from said rear compartment through said heater and said drum to said front compartment, a lint trap dividing said front compartment into upper and lower portions, and an enclosed fan connecting the lower portion of said front compartment with an exhaust duct.

4. In a clothes drier having a cabinet, a bulkhead dividing the interior of said cabinet into front and rear compartments, a clothes receiving drum in the front compartment rotatable about a horizontal axis and having co-axial openings in the front and rear walls thereof, the forward portion only of the circumferential wall of said drum being perforated, a cabinet door closing the front opening in said drum, an air heater in the rear compartment removably mounted on said bulkhead and embracing an opening therein co-axial with the rear opening in said drum, an exhaust duct in said rear compartment having directionally optional outlet ports, and an exhaust fan connecting the bottom of said front compartment with said duct.

5. In a clothes drier having a cabinet, a bulkhead vertically dividing the interior of said cabinet into a larger front compartment and a lesser rear compartment, an open ended drum in said front compartment rotatable on suitable bearings about a horizontal axis, the front portion only of the peripheral wall of said drum having perforations, an air heater in said rear compartment embracing an opening in said bulkhead that is substantially aligned with the rear opening in said drum, a door in said cabinet operable, when closed, to seal off and close the front opening in said drum, an exhaust fan connected with the lowermost portion of said front compartment, said fan, in operation, requiring air entering said drum through said heater to pass through said perforations into said front compartment and thence out of said cabinet through a suitable exhaust outlet.

References Cited in the file of this patent

UNITED STATES PATENTS

| | | |
|---|---|---|
| 2,486,058 | Patterson et al. | Oct. 25, 1949 |
| 2,521,712 | Geldhof | Sept. 12, 1950 |
| 2,543,579 | Kauffmann | Feb. 27, 1951 |
| 2,589,284 | O'Neil | Mar. 18, 1952 |
| 2,716,820 | Bourner | Sept. 6, 1955 |
| 2,727,315 | Candor | Dec. 20, 1955 |
| 2,813,354 | Buck | Nov. 19, 1957 |
| 2,820,304 | Horecky | Jan. 21, 1958 |
| 2,861,355 | Douglas | Nov. 25, 1958 |
| 2,886,901 | Whyte | May 19, 1959 |
| 3,000,108 | Jones | Sept. 19, 1961 |